(12) United States Patent
Kameda

(10) Patent No.: US 7,868,073 B2
(45) Date of Patent: Jan. 11, 2011

(54) RUBBER COMPOSITION

(75) Inventor: Yoshihiro Kameda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 109 days.

(21) Appl. No.: 12/249,280

(22) Filed: Oct. 10, 2008

(65) Prior Publication Data

US 2009/0095394 A1   Apr. 16, 2009

(30) Foreign Application Priority Data

Oct. 10, 2007 (JP) .............................. 2007-264827
Jul. 15, 2008 (JP) .............................. 2008-183819

(51) Int. Cl.
C08K 5/00 (2006.01)
B60C 5/02 (2006.01)
(52) U.S. Cl. ...................................... 524/284; 152/510
(58) Field of Classification Search .................. 524/284
See application file for complete search history.

(56) References Cited

U.S. PATENT DOCUMENTS 7,358,286 B2   4/2008   Hopfmann et al.
2006/0148979 A1*   7/2006   Mori et al. .................. 524/571
2008/0183004 A1*   7/2008   Shieh et al. .................. 560/127

FOREIGN PATENT DOCUMENTS

JP   2006513298   4/2006
KR   20050046850   *   5/2005

OTHER PUBLICATIONS

Translation of KR 2005-0046850, May 2005.*

* cited by examiner

Primary Examiner—Ling-Siu Choi
Assistant Examiner—Hui Chin
(74) Attorney, Agent, or Firm—Connolly Bove Lodge & Hutz LLP

(57) ABSTRACT

A sulfur-vulcanizable rubber composition containing 100 parts by weight of a diene-based rubber, 1 to 30 parts by weight of an ester-based plasticizer having a saturated cyclic structure of the formula (I):

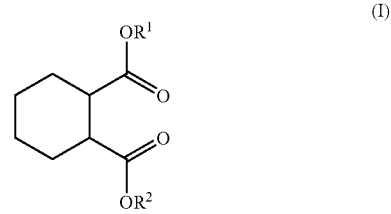

(I)

wherein $R^1$ and $R^2$ independently indicate a hydrogen atom or a $C_1$ to $C_{18}$ organic group and 40 to 120 parts by weight of a reinforcing filler and a pneumatic tire using the same.

4 Claims, 1 Drawing Sheet

RUBBER COMPOSITION

TECHNICAL FIELD

The present invention relates to a rubber composition, more specifically relates to a diene-based rubber composition containing a diene-based rubber, a reinforcing filler such as carbon black and a specified ester-based plasticizer and having an excellent workability and reinforceability of a rubber as well as a pneumatic tire using the same.

BACKGROUND ART

In the past, diisononyl phthalic acids (DIN, DIAN, etc.) have been used as a plasticizer for polyvinyl chloride (PVC) resins, etc. (e.g., see Japanese Patent Publication (A) No. 2006-513298). However, while these plasticizers are used as a shape stabilizer for PVC, they are not known to be compounded into diene-based rubbers.

DISCLOSURE OF THE INVENTION

Accordingly, the object of the present invention is to provide a high reinforceability diene-based rubber composition having an excellent workability.

In accordance with the present invention, there are provided a sulfur-vulcanizable rubber composition comprising 100 parts by weight of a diene-based rubber, 1 to 30 parts by weight of an ester-based plasticizer having a saturated cyclic structure having the formula (I):

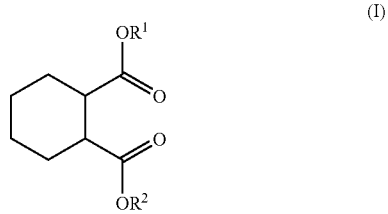

(I)

wherein $R^1$ and $R^2$ independently indicate a hydrogen atom or a $C_1$ to $C_{18}$ organic group and 40 to 120 parts by weight of a reinforcing filler and a pneumatic tire using the same.

According to the present invention, by blending a specific ester-based plasticizer into a diene-based rubber, it is possible to obtain a high reinforceability rubber composition superior in workability.

BRIEF DESCRIPTION OF THE DRAWINGS

The present invention will now be explained to illustrate the present invention, in which.

BEST MODE FOR CARRYING OUT THE INVENTION

Figure 1:
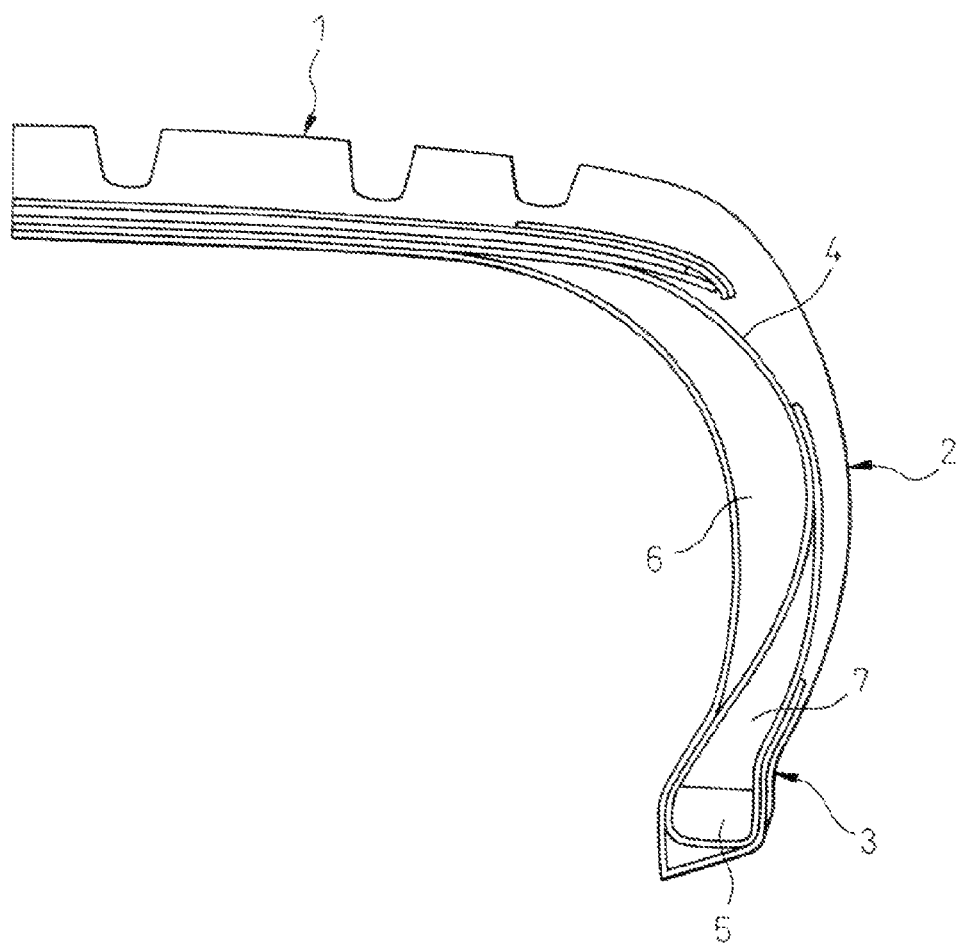
FIG. 1 is a cross-sectional view along the meridial line showing an Example of a pneumatic tire according to the present invention, wherein 1: tread part, 2: side wall part, 3: bead part, 4: carcass layer, 5: bead core, 6: crescent cross-sectional shaped rubber reinforcing liner layer and 7: bead filler.

In this specification and in the claims which follow, the singular forms "a", "an" and "the" include plural referents unless the context clearly dictates otherwise.

The inventors engaged in research to solve the problem and, as a result, found that, when an ester-based plasticizer having the formula (I) is compounded into adiene-based rubber, it is possible to obtain a diene-based rubber composition having an excellent temperature dependency, reinforceability, physical properties in an unvulcanized state and factory workability when compared with the prior art.

The diene-based rubber usable in the present invention is not particularly limited. For example, natural rubber (NR), polyisoprene rubber (IR), polybutadiene rubber (BR), styrene-butadiene copolymer rubber (SBR), or the above diene-based rubbers modified with an epoxy group, alkoxy group, amino group, hydroxyl group, etc. and any blends thereof may be used. Note that another rubber may also be used as a minor component.

The rubber composition according to the present invention includes the ester-based plasticizer having the above formula (I) in an amount, based upon 100 parts by weight of the diene-based rubber, of 1 to 30 parts by weight, preferably 2 to 25 parts by weight. If this amount is smaller than 1 part by weight, the desired effect cannot be obtained, while conversely if more than 30 parts by weight, the vulcanizing time becomes longer and the productivity is unpreferably decreased.

In the above formula (I), $R^1$ and $R^2$ independently indicate a hydrogen atom or a $C_1$ to $C_{18}$ organic group, preferably an alkyl group, $C_2$ to $C_{18}$ alkenyl group including a branched or unsaturated or saturated, cyclic (e.g., bicyclo) structure, etc., more preferably a $C_4$ to $C_{12}$, particularly preferably $C_4$ to $C_9$ organic group. The most preferable mode is a $C_4$ to $C_9$ alkenyl group.

The ester-based plasticizer having the formula (I), for example as described in Japanese Patent Publication (A) No. 2006-513298 etc., is a poly(vinyl chloride) resin or other known substance conventionally used as a plasticizer. In the present invention, such a known substance (e.g., dioctylphthalate diisononyl phthalate) can also be used.

The rubber composition according to the present invention contains, based upon 100 parts by weight of the diene-based rubber, 40 to 120 parts by weight, preferably 60 to 100 parts by weight of a reinforcing filler, for example, carbon black (SAF grade, ISAF grade, HAF grade, FEF grade, or GPF grade). If the amount of the reinforcing filler is smaller than 40 parts by weight, the reinforceability becomes small, while conversely if more than 120 parts by weight, the work moldability becomes unpreferably inferior.

The rubber composition according to the present invention preferably contains, in addition to the above plasticizer, based upon 100 parts by weight of the diene-based rubber, a cashew-modified phenol resin and a methylene donor in a weight ratio (cashew modified phenol resin:methylene donor) of 0.9 to 45:0.1 to 5, preferably 3 to 40:0.5 to 4, and in a total amount of preferably 1 to 50 parts by weight, more preferably 5 to 40 parts by weight, based upon 100 parts by weight of the diene-based rubber. If the amount of the cashew-modified phenol resin is small, the increase in a degree of the hardening becomes lower, so this is not preferred, while conversely if the compounded amount of the methylene donor is small, a rate of the hardening reaction of the rubber formulation becomes lower, so this is not preferred. On the other hand, if the total amount of the cashew-modified phenol resin and the methylene donor is smaller than 1 part by weight, the effect of increasing the hardness becomes small, while conversely if more than 50 parts by weight, the resultant composition becomes too hard and the action or function, as a rubber composition, becomes unpreferably lower.

As the cashew-modified phenol resin usable in the present invention, for example, there are the known substances commercially available by, for example, Sumitomo Bakelite K. K., Cashew K. K., etc. In the present invention, commercially available products such as Sumilite Resin may be used.

The methylene donor usable in the present invention is, for example, a known substance marketed by Ouchi Shinko Chemical Industrial. In the present invention, commercially available products such as Noccelar H—PO may be used.

The rubber composition according to the present invention is not particularly limited in the application use thereof, but for example, from the viewpoint of the strength, a pneumatic tire using the same as a liner reinforcing layer of a run flat tire or, from the viewpoint of the modulus of elasticity, a pneumatic tire using the same as a bead filler of the tire is preferable (see FIG. 1).

The rubber composition according to the present invention may have blended into it, in addition to the above ingredients, silica or another filler, a vulcanization or cross-linking agent, a vulcanization or cross-linking accelerator, various types of oil, an antiaging agent, a plasticizer, and other various additives generally blended into tire and other rubber compositions. The additives may be kneaded in by a general method to obtain a composition for vulcanization or cross-linking. The amounts of these additives blended can be made the conventional general amounts so long as the object of the present invention is not contravened.

EXAMPLES

Examples will now be explained to further illustrate the present invention, but the present invention is by no means limited to these Examples.

Examples 1 to 2 and Comparative Examples 1 to 3

Preparation of Samples

In each of the formulations (parts by weight) shown in Table I, the ingredients other than the vulcanization accelerator and sulfur are mixed in a 1.8 liter internal mixer for 6 minutes. When reaching 155° C., the resultant mixture was discharged to obtain a master batch. To this master batch, the vulcanization accelerator and sulfur were mixed by an open roll to obtain a rubber composition. This rubber composition was used for the evaluation of the unvulcanized physical properties by the test methods shown below. The results are shown, as indexed to the values of Comparative Example 1 as 100, in Table I.

Next, each rubber composition obtained was vulcanized in a 15×15×0.2 cm mold at 160° C. for 25 minutes to prepare a vulcanized rubber sheet, which was then used for the determination of physical properties of the vulcanized rubber by the following test methods. The results are shown, as indexed to the values of Comparative Example 1 as 100, in Table I.

Test Methods for Evaluation of Rubber Physical Property

Mooney viscosity: Measured according to JIS K6300 at 100° C. The smaller the value, the better the workability (or processability) and the better the factory work efficiency indicated.

Vulcanization time: The time until reaching a 95% vulcanization degree, measured according to JIS K6300. The smaller the value, the shorter the vulcanization time and the better the factory work efficiency indicated.

Extrudability: The die swell amount at the time of extrusion at a temperature of 100° C., a die of D=2 mm and L/D=16 and a speed of 150/s. The smaller the value, the better the shaping stability indicated.

Temperature dependency of modulus: The temperature dependency found from the modulus of elasticity E' by the following formula, when measuring the modulus using a viscoelasticity spectrometer made by Iwamoto Seisakusho under conditions of an elastic deformation strain rate of 10±2%, a number of vibration of 20 Hz, and temperatures of 20° C. and 60° C. The smaller the value, the smaller the temperature dependency and the more robust against temperature changes indicated.

$$E'(20° C.) - E'(60° C.)/40$$

TABLE I

|  | Comparative Example | | | Example | |
| --- | --- | --- | --- | --- | --- |
|  | 1 | 2 | 3 | 1 | 2 |
| Formulation (parts by weight) | | | | | |
| NR | 50 | 50 | 50 | 50 | 50 |
| BR | 50 | 50 | 50 | 50 | 50 |
| CB | 65 | 65 | 65 | 65 | 65 |
| Zinc white | 2.5 | 2.5 | 2.5 | 2.5 | 2.5 |
| Stearic acid | 2 | 2 | 2 | 2 | 2 |
| Aromatic oil | 5 | 25 | — | — | — |
| Hexamoll | — | — | 35 | 5 | 25 |
| Sulfur | 2 | 2 | 2 | 2 | 2 |
| NS | 2 | 2 | 2 | 2 | 2 |
| Evaluated physical properties | | | | | |
| Mooney viscosity | 100 | 88 | 75 | 98 | 83 |
| Vulcanization time | 100 | 110 | 108 | 98 | 101 |
| Extrudability | 100 | 90 | 94 | 95 | 90 |
| Temperature dependency of modulus | 100 | 101 | 83 | 94 | 82 |

Notes of Table I
NR (natural rubber): RSS#3
BR: Polybutadiene Nipol BR1220 made by Nippon Zeon
CB: Carbon Black Seast made by Tokai Carbon
Zinc white: Zinc Oxide No. 3 made by Seido Chemical Industry
Stearic acid: Beads Stearic Acid made by NOF Corporation
Aromatic oil: Extract#4S made by Showa Shell Petroleun
Hexamoll: Hexamoll-Dinch made by BASF

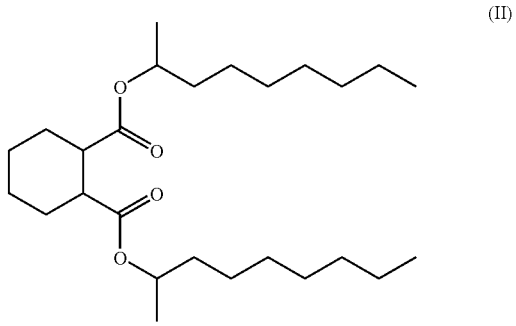

(II)

Cyclohexane dicarbonic isononyl ester (trade name: Hexamoll-Dinch (made by BASF))

Sulfur: Oil-treated sulfur made by Hosoi Chemical Industry

NS: NS-P made by Ouchi Shinko Chemical Industrial

Examples 3 to 5 and Comparative Examples 4 to 7

Preparation of Samples

In each of the formulations (parts by weight) shown in Table II, the ingredients other than the vulcanization accelerator and sulfur are mixed in a 1.8 liter internal mixer for 6 minutes. When reaching 155° C., the resultant mixture was discharged to obtain a master batch. To this master batch, the vulcanization accelerator and sulfur were mixed by an open roll to obtain a rubber composition. This rubber composition was used for evaluation of the unvulcanized physical properties by the above-mentioned test methods. The results are shown, as indexed to the values of Comparative Example 2 as 100, in Table II.

Next, each rubber composition obtained above was vulcanized in a 15×15×0.2 cm mold at 160° C. for 25 minutes to prepare a vulcanized rubber sheet, which was then used for the determination of physical properties of the vulcanized rubber by the following test methods. The results are shown, as indexed to the values of Comparative Example 2 as 100 in Table II.

TABLE II

| | Comparative Example | | | | Example | | |
|---|---|---|---|---|---|---|---|
| | 4 | 5 | 6 | 7 | 3 | 4 | 5 |
| Formulation (parts by weight) | | | | | | | |
| NR | 70 | 70 | 70 | 70 | 70 | 70 | 70 |
| SBR | 30 | 30 | 30 | 30 | 30 | 30 | 30 |
| CB | 50 | 50 | 50 | 50 | 50 | 50 | 50 |
| Zinc white | 2 | 2 | 2 | 2 | 2 | 2 | 2 |
| Stearic acid | 2 | 2 | 2 | 2 | 2 | 2 | 2 |
| Aromatic oil | — | — | 15 | — | — | — | — |
| Cashew modified phenol resin | 15 | 15 | — | 15 | 15 | 15 | 15 |
| Cardanol oligomer | 5 | 20 | 5 | — | — | — | — |
| Hexamoll | — | — | — | 5 | 5 | 10 | 20 |
| Hexamethylene tetramine | 2 | 2 | 2 | — | 2 | 2 | 2 |
| Sulfur | 2 | 2 | 2 | 2 | 2 | 2 | 2 |
| NS | 2 | 2 | 2 | 2 | 2 | 2 | 2 |
| PVI | 0.3 | 0.3 | 0.3 | 0.3 | 0.3 | 0.3 | 0.3 |
| Evaluated physical properties | | | | | | | |
| Mooney viscosity | 100 | 81 | 74 | 99 | 100 | 89 | 80 |
| Scorch | 100 | 108 | 103 | 105 | 103 | 105 | 110 |
| Vulcanization time | 100 | 102 | 107 | 108 | 96 | 98 | 95 |
| Extrudability | 100 | 115 | 96 | 99 | 95 | 88 | 85 |
| Hardness(60° C.) | 100 | 90 | 79 | 98 | 108 | 103 | 100 |
| 100% modulus | 100 | 90 | 80 | 102 | 110 | 107 | 103 |
| Temperature dependency of modulus | 100 | 120 | 97 | 90 | 90 | 93 | 96 |

Notes of Table II
NR (natural rubber): RSS#3
SBR: Styrene-butadiene copolymer Nipol 1502 made by Nippon Zeon
CB: Carbon Black Seast M made by Tokai Carbon
Zinc white: Zinc Oxide No. 3 made by Seido Chemical Industry
Stearic acid: Beads Stearic Acid made by NOF Corporation
Aromatic oil: Extract#4S made by Showa Shell Petroleun
Cashew-modified phenol resin: Sumilite Resin made by Sumitomo Bakelite
Cardanol oligomer: Cardanol Oligomer made by Tohoku Chemical Industries Ltd.
Hexamoll: Hexamoll-Dinch made by BASF (see above formula (II))
Hexamethylene tetramine: Noccelar H-PO (methylene donor) made by Ouchi Shinko Chemical Industrial
Sulfur: Oil-treated sulfur made by Hosoi Chemical Industry
NS: NS-P made by Ouchi Shinko Chemical Industrial
PVI: Santogard PVI made by Flexsys Test Methods for Evaluation of Rubber Physical Property
Scorch: Measured at 125° C. according to JIS K6300. The larger the value, the better the workability indicated.
Hardness (60° C.): Measured in 60° C. atmosphere according to JIS K6253. The larger the value, the better.
100% modulus: Modulus at time of 100% stretching measured according to JIS K6251. The larger this value, the higher the reinforcing effect and the better the reinforcing performance.

Note that the Mooney viscosity, vulcanization time, extrudability and temperature dependency of the modulus were measured as explained above.

INDUSTRIAL APPLICABILITY

According to the present invention, by compounding the ester-based plasticizer having the above formula (I) into a diene-based rubber, it is possible to obtain a rubber composition having an excellent temperature dependency, reinforcing performance and factory work efficiency even compared with conventional rubber compositions. This is useful as a liner reinforcing layer of a run flat tire or a bead filler, rim cushion, carcass coat rubber, belt coat rubber, etc. of a pneumatic tire.

The invention claimed is:

1. A sulfur-vulcanizable rubber composition comprising 100 parts by weight of a diene-based rubber, 1 to 30 parts by weight of an ester-based plasticizer having a saturated cyclic structure of the formula (I):

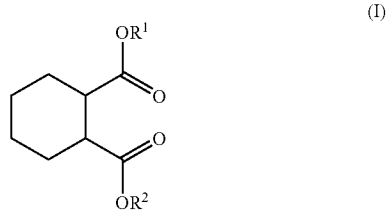

(I)

wherein $R^1$ and $R^2$, independently, indicate a hydrogen atom or a $C_1$ to $C_{18}$ organic group and 40 to 120 parts by weight of a reinforcing filler.

2. A rubber composition as claimed in claim 1, further comprising, based upon 100 parts by weight of the diene-based rubber, a cashew-modified phenol resin and methylene donor weight ratio of 0.9 to 45:0.1 to 5, in a total amount of 1 to 50 parts by weight.

3. A pneumatic tire using a rubber composition according to claim 1 for a liner reinforcing layer of a run flat tire.

4. A pneumatic tire using a rubber composition according to claim 1 for a bead filler of a tire.

* * * * *